United States Patent
Liu et al.

(10) Patent No.: US 8,368,362 B2
(45) Date of Patent: Feb. 5, 2013

(54) BOOST-FORWARD-FLYBACK HIGH GAIN CONVERTER

(75) Inventors: Huan Tsai Liu, Yunlin County (TW); Kuo Ching Tseng, Yunlin County (TW); Po Chih Chou, Yunlin County (TW)

(73) Assignee: National Formosa University, Yunlin County (TW)

( * ) Notice: Subject to any disclaimer, the term of this patent is extended or adjusted under 35 U.S.C. 154(b) by 352 days.

(21) Appl. No.: 12/874,339

(22) Filed: Sep. 2, 2010

(65) Prior Publication Data
US 2012/0057373 A1    Mar. 8, 2012

(51) Int. Cl.
G05F 1/613    (2006.01)
H02M 7/00    (2006.01)

(52) U.S. Cl. ........ 323/225; 323/271; 323/288; 323/290; 363/65

(58) Field of Classification Search ................. 323/225, 323/271, 282, 284, 288, 290; 363/65–72
See application file for complete search history.

(56) References Cited

U.S. PATENT DOCUMENTS

| | | | | |
|---|---|---|---|---|
| 5,909,107 A * | 6/1999 | Aonuma et al. | ............. | 323/222 |
| 7,161,331 B2 * | 1/2007 | Wai et al. | ...................... | 323/222 |
| 7,375,985 B2 * | 5/2008 | Wai et al. | ........................ | 363/17 |
| 7,382,113 B2 * | 6/2008 | Wai et al. | ...................... | 323/222 |
| 2011/0292690 A1 * | 12/2011 | Liang et al. | ................ | 363/21.12 |
| 2012/0243279 A1 * | 9/2012 | Zacharias et al. | ............. | 363/131 |

* cited by examiner

*Primary Examiner* — Jessica Han
(74) *Attorney, Agent, or Firm* — Alan Kamrath; Kamrath IP Lawfirm, P.A.

(57) ABSTRACT

A boost-forward-flyback convertor has a boost converting circuit, a forward converting circuit, a flyback converting circuit and a transformer. The boost converting circuit, the forward converting circuit and the flyback converting circuit are coupled by using elements of the boost and forward converting circuits to form the transformer. The boost-forward-flyback convertor combines benefits of conventional boost, forward and flyback convertors, specifically combines active clamping and lower power pressure to the element from the boost convertor, increases gain ratio by using the forward convertor and provides output to the load during a switch OFF-state from the combination of the flyback and boost converting circuit. The boost-forward-flyback convertor combines benefits of conventional boost, forward and flyback convertors and not only has very high gain, high converting efficiency and lower power loading for devices, but also is simple, cost less, easy to use and has a small volume.

4 Claims, 9 Drawing Sheets

… …

BOOST-FORWARD-FLYBACK HIGH GAIN CONVERTER

BACKGROUND OF THE INVENTION

1. Field of Invention

The present invention relates to a converter and more particular to a high gain converter with an integrated boost, forward and flyback converting circuit.

2. Description of the Related Art

A converter, also known as a converting circuit, is currently one of the most important circuits for electronic apparatuses. A converter may be an isolated type or a non-isolated type. Typically, the non-isolated type converter comprises a back converter and a boost converter. The isolated type converter comprises half-bridge, full-bridge, push-pull converters, etc. Conventional converters are simple, have few elements and cost less, but are not suitable for direct application to renewable energy applications, such as solar cells, wind power, Biofuel or the like, since output voltages of renewable energy applications are usually quite low and the conventional converters do not have enough gain in voltage transformation. Thus, high gain converters are necessary for renewable energy applications. However, compared to the traditional converters, present conventional high gain converters are complex, more expensive, suffer heat generating issues and are very large.

The present invention provides a boost-forward-flyback high gain converter to mitigate or obviate shortcomings of a conventional converter.

SUMMARY OF THE INVENTION

The primary objective of the present invention is to provide a boost-forward-flyback converter to improve voltage gain, decrease cost and simplify the voltage converting circuit.

A boost-forward-flyback convertor has a boost converting circuit, a forward converting circuit, a flyback converting circuit and a transformer. The boost converting circuit, the forward converting circuit and the flyback converting circuit are coupled by using elements of the boost and forward converting circuits to form the transformer. The boost-forward-flyback convertor combines benefits of conventional boost, forward and flyback convertors, specifically combines active clamping and lower power pressure to the element from the boost convertor, increases gain ratio by using the forward convertor and provides output to the load during a switch OFF-state from the combination of the flyback and boost converting circuit. The boost-forward-flyback convertor combines benefits of conventional boost, forward and flyback convertors and not only has very high gain, high converting efficiency and lower power loading for devices, but also is simple, cost less, easy to use and has a small volume. Other objectives, advantages and novel features of the invention will become more apparent from the following detailed description when taken in conjunction with the accompanying drawings.

DETAILED DESCRIPTION OF THE INVENTION

Figure 1:
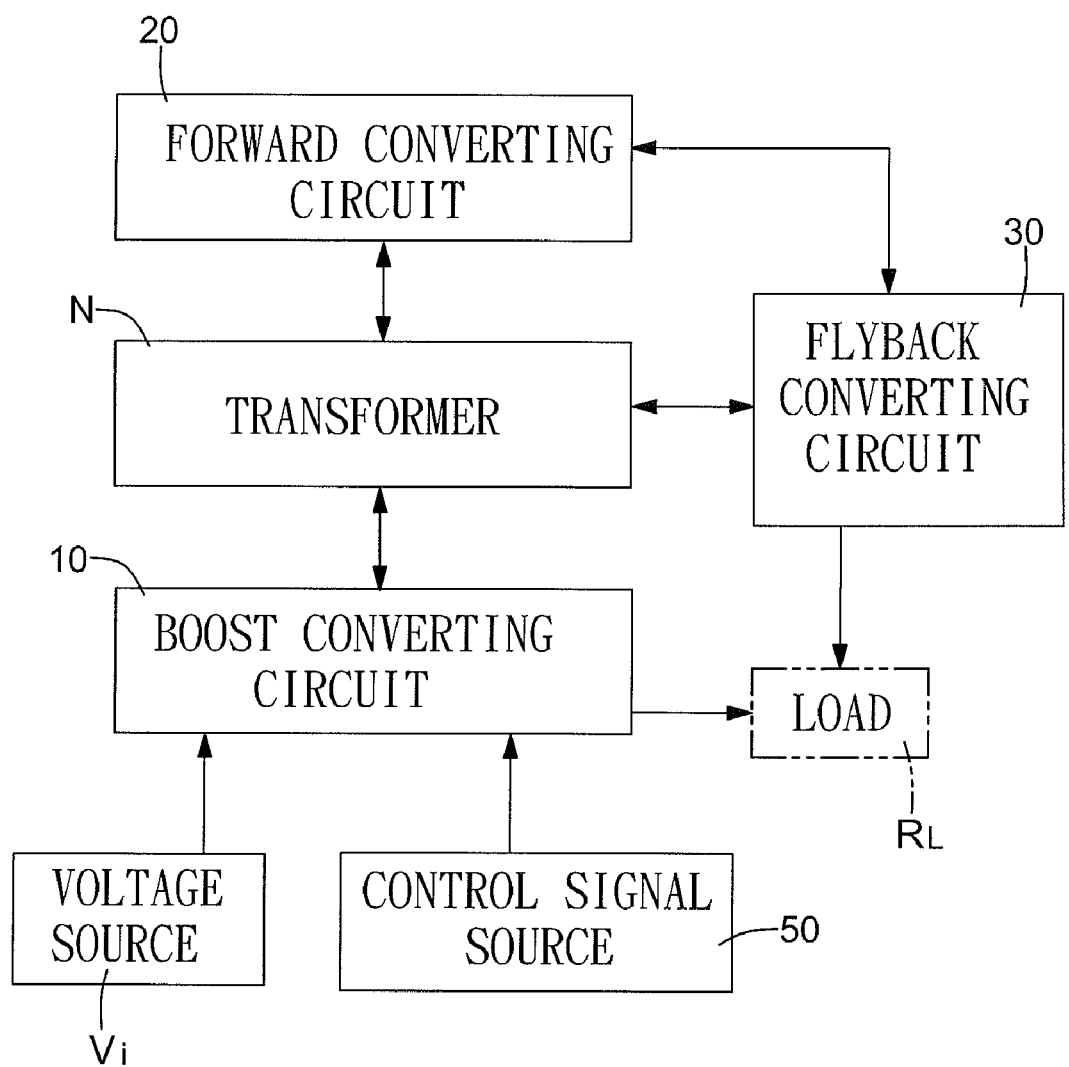
FIG. 1 is a block diagram of a boost-forward-flyback high gain convertor in accordance with the present invention.
Figure 2:
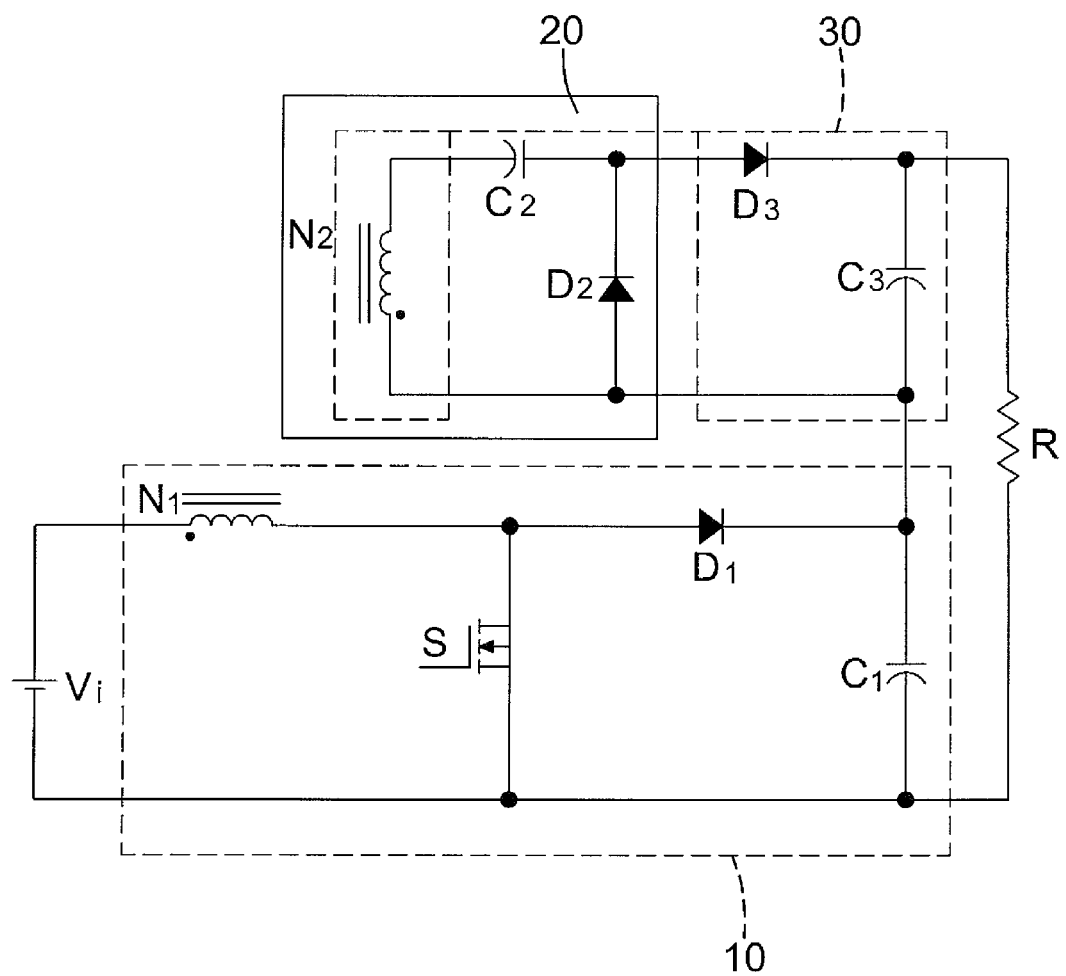
FIG. 2 is a circuit diagram of the boost-forward-flyback high gain convertor in FIG. 1.

With reference to FIGS. 1 and 2, a boost-forward-flyback high gain converter in accordance with the present invention comprises a boost converting circuit (10), a forward converting circuit (20), a flyback converting circuit (30) and a transformer (N) and may be implemented in numerous embodiments depending on the implementation of the converting circuits (10, 20, 30) . . . .

The boost converting circuit (10) connects to an external voltage source (Vi) and an external control signal source (50) as inputs, is coupled to a load ($R_L$) and comprises a switch (S), an input coil (N1), a boost diode (D1) and a boost capacitor (C1).

The control signal source (50) sends a control signal to the boost converting circuit (10) to activate voltage conversion between the voltage source (Vi) and the load ($R_L$). The control signal source 50 may be a pulse width modulation (PWM) or the like.

The switch (S) may be a BJT, FET or the like, is connected to the control signal source (50) and has a control end, a first end and a second end. The particular embodiment described uses an FET as the switch (S). The control end is connected to and receives the control signal from the control source (50). The FET has a drain and a source. The drain is the first end of the switch (S). The source is the second end of the switch (S). Since the switch (S) is in the boost converting circuit (10), the power loading of the switch (S) is decreased and may use a lower power device to decrease cost of the present embodiment.

The input coil (N1) has a first end and a second end The first end is connected to the voltage source (Vi). The second end is connected to the first end of the switch (S).

The boost diode (D1) has an anode and a cathode. The anode is connected to the first end of the switch (S).

The boost capacitor (C1) has a first end and a second end. The first end is connected to the cathode of the boost diode (D1). The second end is connected to the second end of the switch (S) and the voltage source (Vi).

Figure 3A:
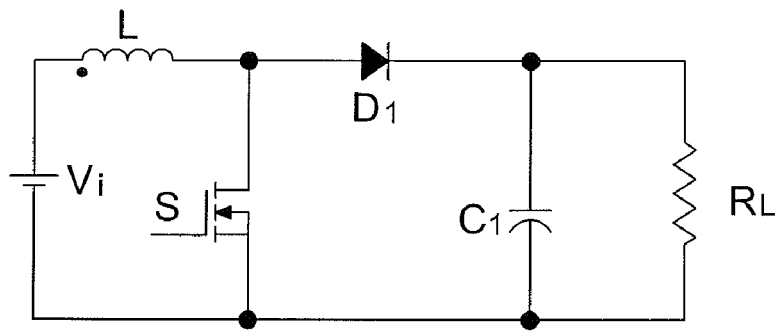
FIG. 3A is a circuit diagram of a boost converting circuit of the boost-forward-flyback high gain convertor in FIG. 1.
Figure 3B:
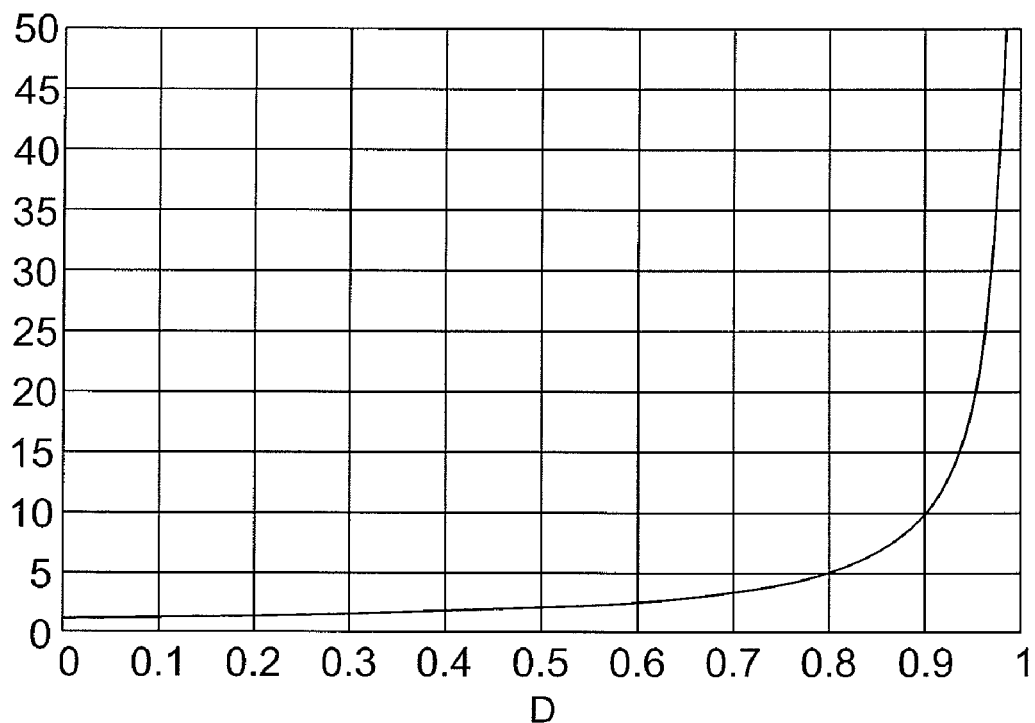
FIG. 3B is a simulation result of the boost converting circuit in FIG. 3A.

With further reference to FIGS. 3A and 3B, voltage gain of the boost converting circuit (10) is calculated using Equation (1) below:

$$G(D) = \frac{V_O}{V_I} = \frac{1}{1-D} \quad (1)$$

The forward converting circuit (20) comprises an output coil (N2), a forward capacitor (C2) and a forward diode (D2). The output coil (N2) has a first end and a second end. The forward capacitor (C2) has a first end and a second end. The first end is connected to the first end of the output coil (N2). The forward diode (D2) has an anode and a cathode. The anode is connected to the second end of the output coil (N2). The cathode is connected to the second end of the forward capacitor (C2).

Figure 4A:
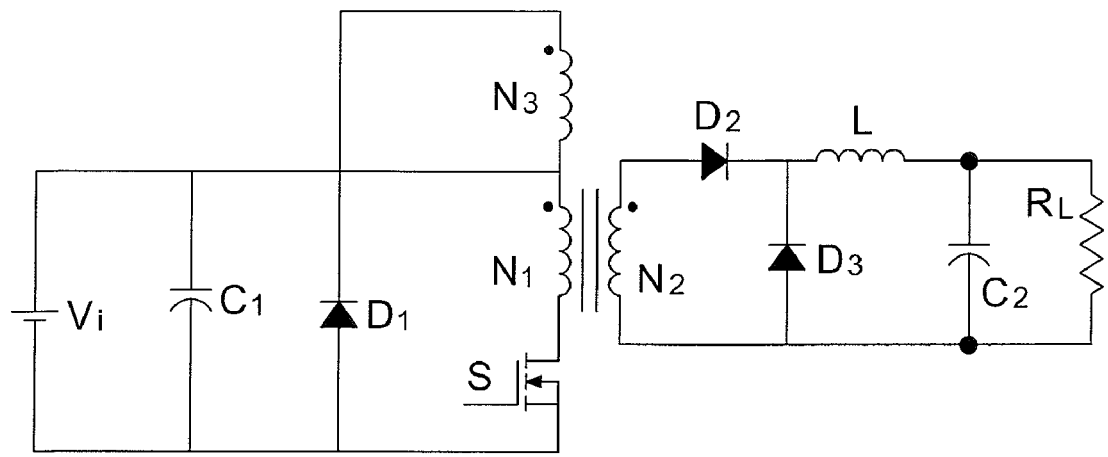
FIG. 4A is a circuit diagram of a forward converting circuit model of the boost-forward-flyback high gain convertor in FIG. 1.
Figure 4B:
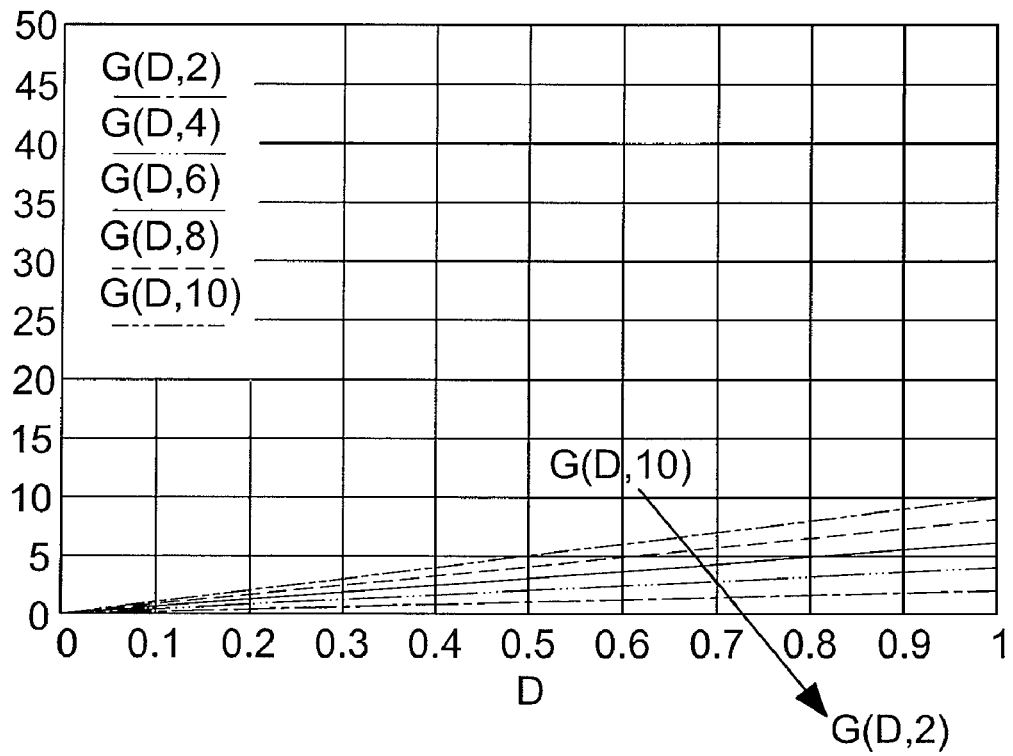
FIG. 4B is a simulation result of the forward converting circuit model in FIG. 4A.

With further reference to FIGS. 4A and 4B, voltage gain of the forward converting circuit 20 is calculated using Equation (2) below:

$$G\left(D, \frac{N_2}{N_1}\right) = \frac{V_O}{V_I} = \frac{N_2}{N_1} D \quad (2)$$

The flyback converting circuit (30) is coupled to the output coil (N2) and comprises a flyback diode (D3) and a flyback capacitor (C3). The flyback diode (D3) has an anode and a cathode. The anode is connected to the second end of the forward capacitor (C2) and the cathode of the forward diode (D2). The flyback capacitor (C3) is connected in series to the boost capacitor (C1) and the flyback capacitor (C3). The boost capacitor (C1) is connected in parallel to the load (RD. The flyback capacitor (C3) has a first end and a second end. The first end is connected to the cathode of the flyback diode (D3). The second end is connected to the anode of the forward diode (D2).

Figure 5A:
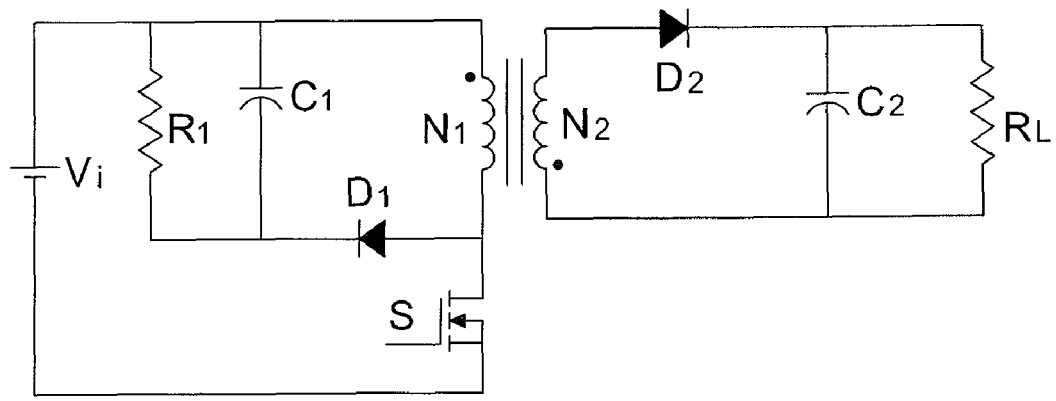
FIG. 5A a circuit diagram of a flyback converting circuit model of the boost-forward-flyback high gain convertor in FIG. 1.
Figure 5B:
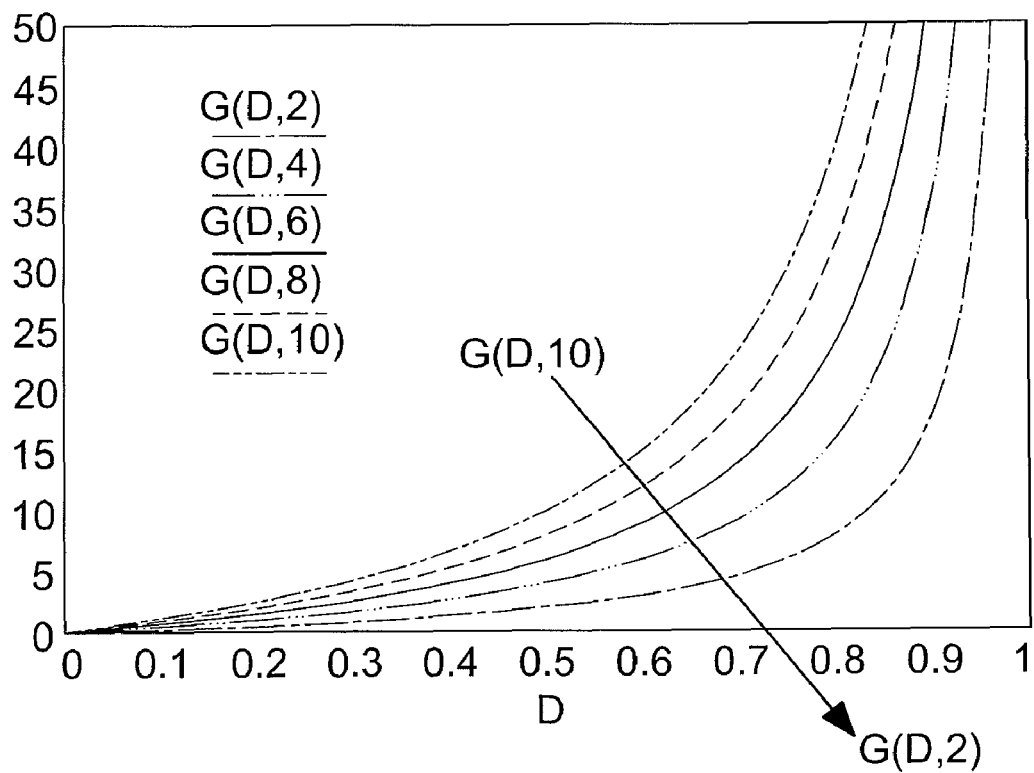
FIG. 5B is a simulation result of the flyback converting circuit model in FIG. 5A.

The transformer (N) is formed from the output coil (N2) in the forward converting circuit (20) and the input coil (N1) of the boost converting circuit (10), With further reference to FIGS. 5A and 5B, voltage gain of the flyback converting circuit (30) is calculated using Equation (3) below:

$$G\left(D, \frac{N_2}{N_1}\right) = \frac{V_O}{V_I} = \frac{N_2}{N_1} \frac{D}{1-D} \quad (3)$$

Figure 6A:
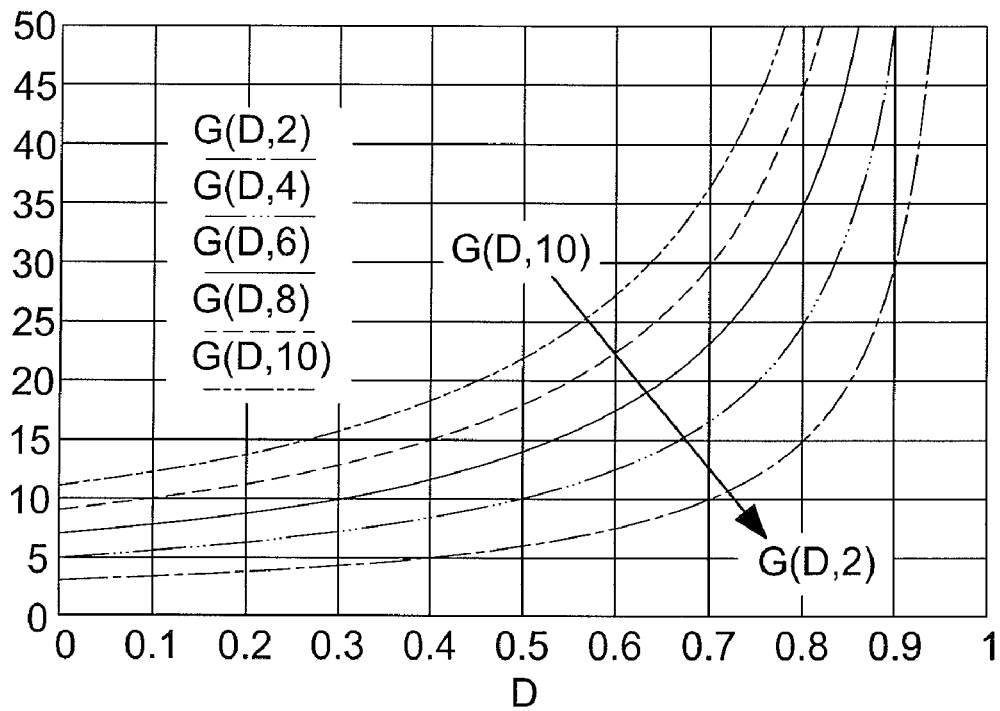
FIG. 6A is gain measurement results of the boost-forward-flyback high gain convertor in FIG. 1.
Figure 6B:
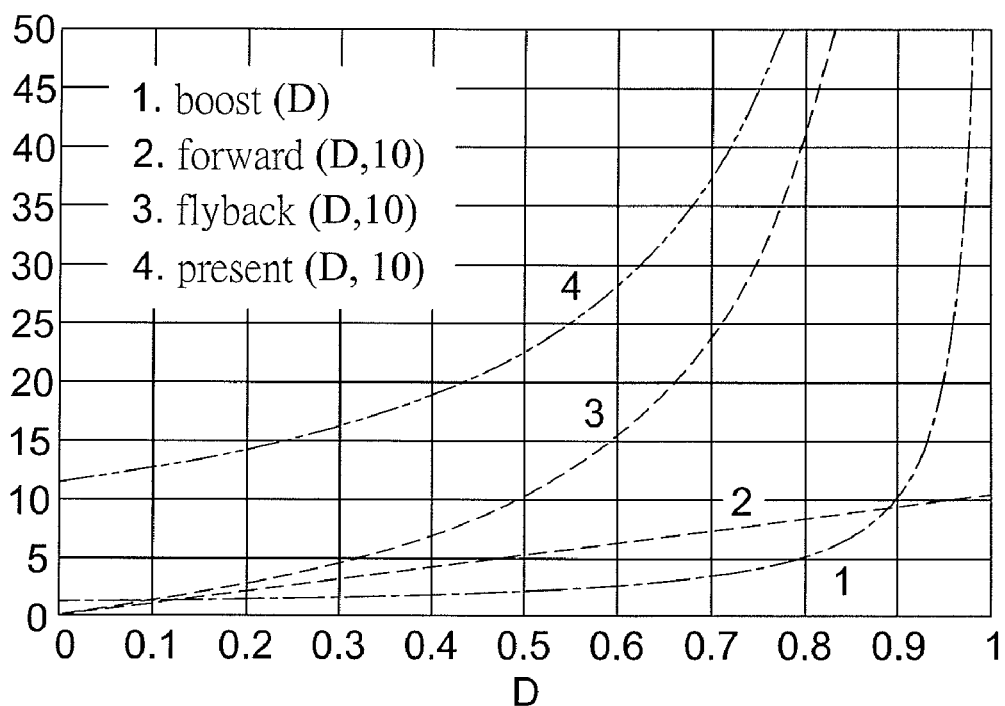
FIG. 6B is a comparison of the gain measurement results of the boost, forward, flyback converting circuit and the boost-forward-flyback high gain convertor in accordance with the present invention.

With further reference to FIGS. 6A and 6B, a voltage gain simulation and a voltage gain comparison clearly show that the present embodiment has a very high voltage gain compared respectively to the boost, forward and flyback converting circuit. The voltage gain of the present embodiment is calculated using Equation (4) below.

$$G\left(D, \frac{N_2}{N_1}\right) = \frac{V_O}{V_I} = \frac{1 + \frac{N_2}{N_1}}{1-D} \quad (4)$$

Figure 8A:
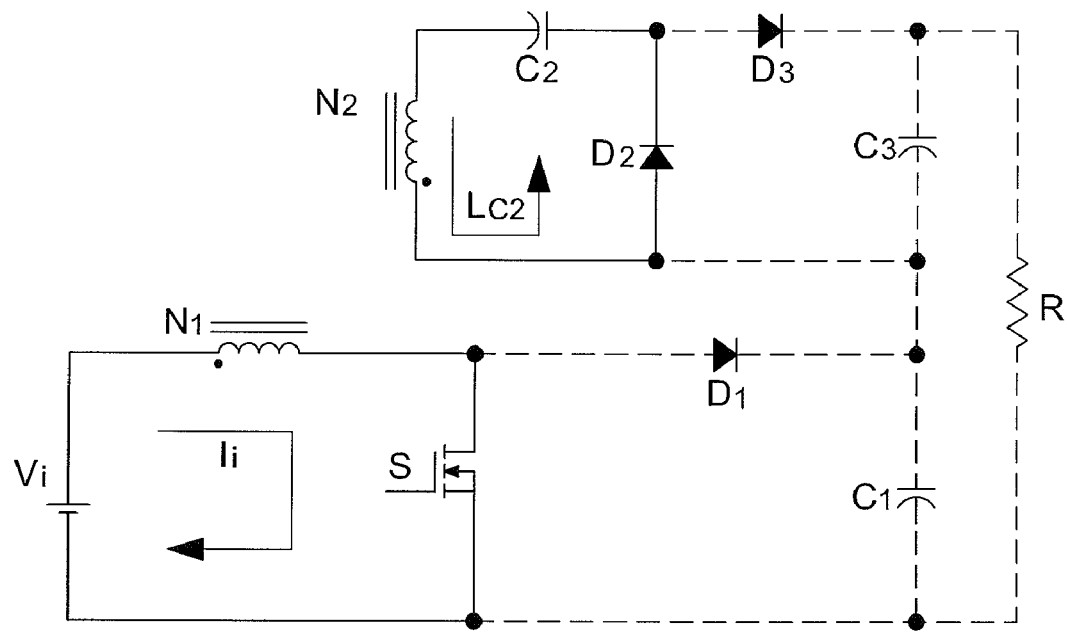
FIG. 8A is a steady state current flow model for a boost-forward-flyback high gain convertor in accordance with the present invention.

With further reference to FIG. 8A, a steady state condition exists ($T_{ON}(DT_S)$) when the switch (S) is turned ON and voltage drops on the input coil (N1) and the flyback capacitor (C3) are:

$$VLm = VI$$
$$VC3 = \frac{N2}{N1} VI$$

Figure 8B:
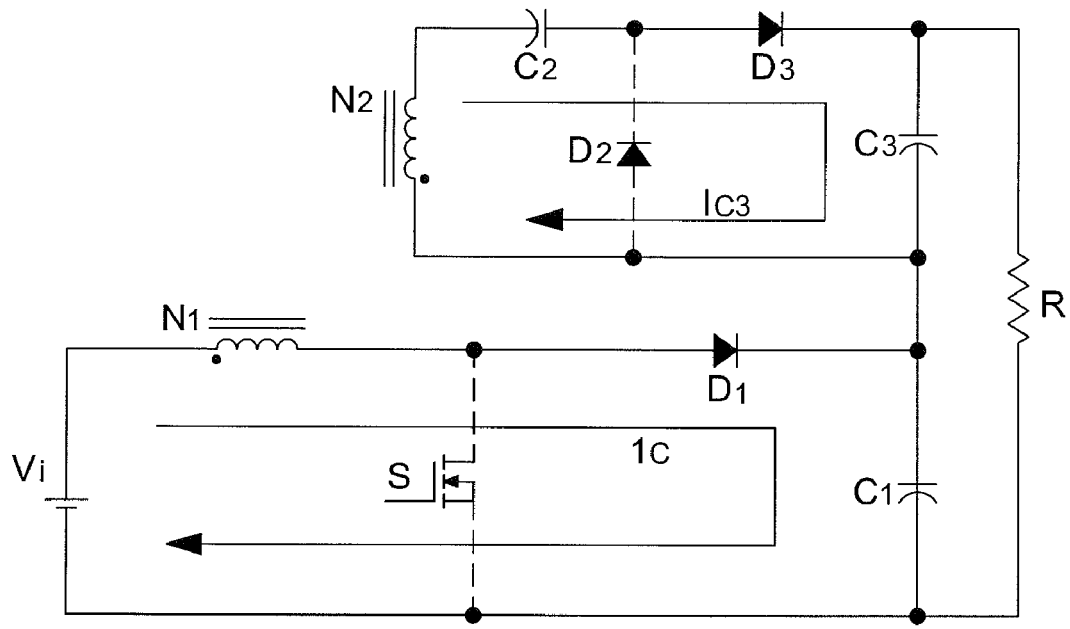
FIG. 8B is a current flow model during a switch-off state of the boost-forward-flyback high gain convertor in accordance with the present invention.

When the switch (S) is turned OFF and the present embodiment is under $T_{ON}[(1-D) T_S]$ state shown in FIG. 8B, the voltage drop Equations on the input coil (N1) and the flyback capacitor (C3) may become:

$$VLm = Vc1 - VI \quad (5)$$
$$VI \cdot D = (Vc1 - VI)(1 - D)$$
$$V_{C1} = \frac{V_1}{1-D}$$

$$V_{C3} = V_{N2} + V_{C2} \quad (6)$$
$$= \frac{N2}{N1}(V_{C1} - V_I) + \frac{N2}{N1} VI$$
$$= \frac{N2}{N1} \frac{V_1}{1-D}$$

Furthermore, output voltage dropped on the load ($R_L$) may be $$V_o = V_{C1} + V_{C3} \quad (7)$$
$$= \frac{V_1}{1-D} + \frac{N2}{N1} \frac{V_1}{1-D}$$

Thus, voltage gain in Equation (4) of the present embodiment may be derived from Equation (5) to (7). Consequently, the present embodiment has a very high voltage gain and uses very few circuit elements, so manufacturing cost should decrease dramatically. Further, volume and complexity over conventional prior art converters are also solved in the present embodiment since only one PWM circuit is needed for the boost-forward-flyback high gain convertor during use.

Figure 7:
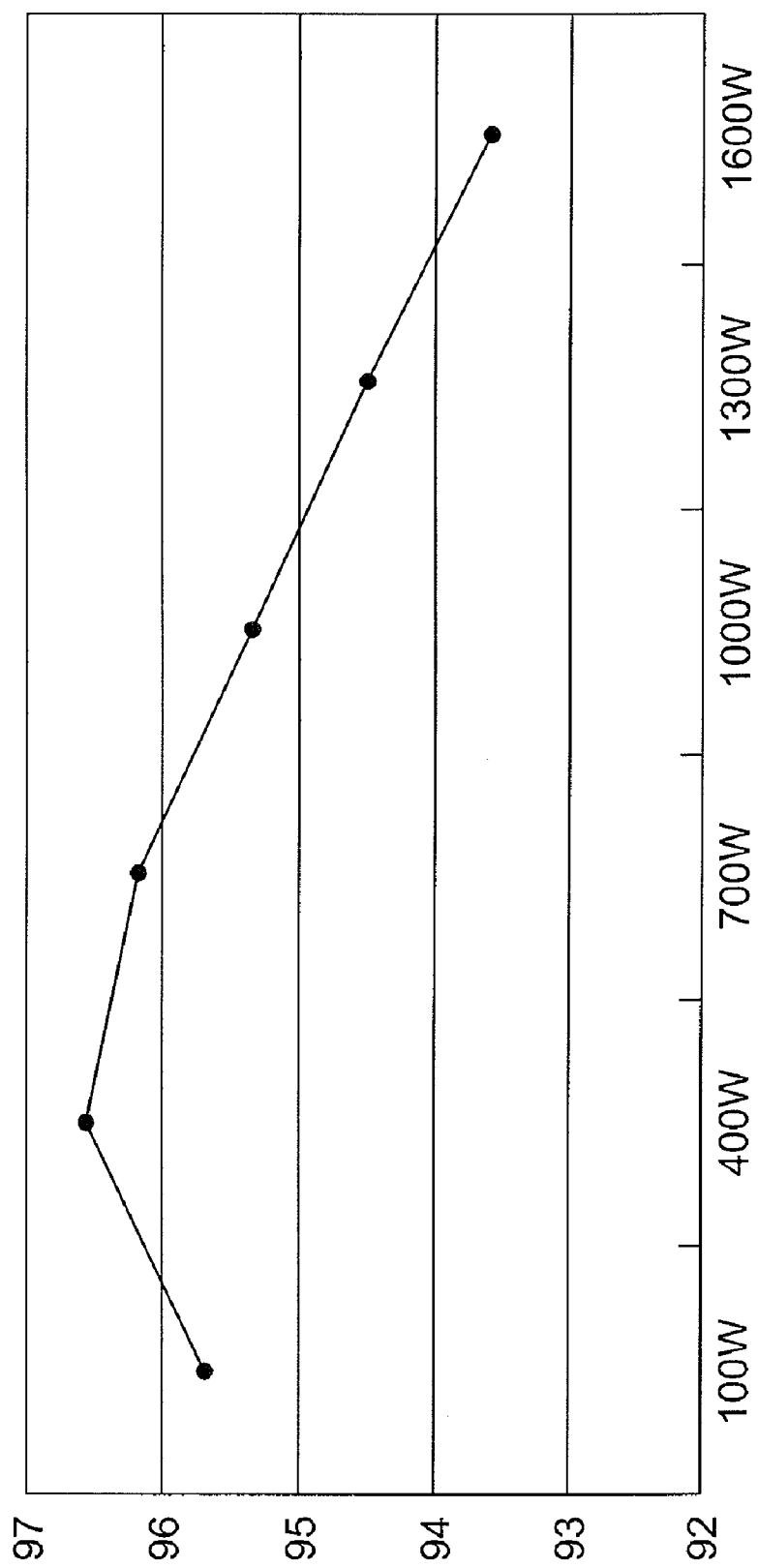
FIG. 7 is a measurement result for power-gain effectiveness of the boost-forward-flyback high gain convertor in accordance with the present invention.
Figure 9A:
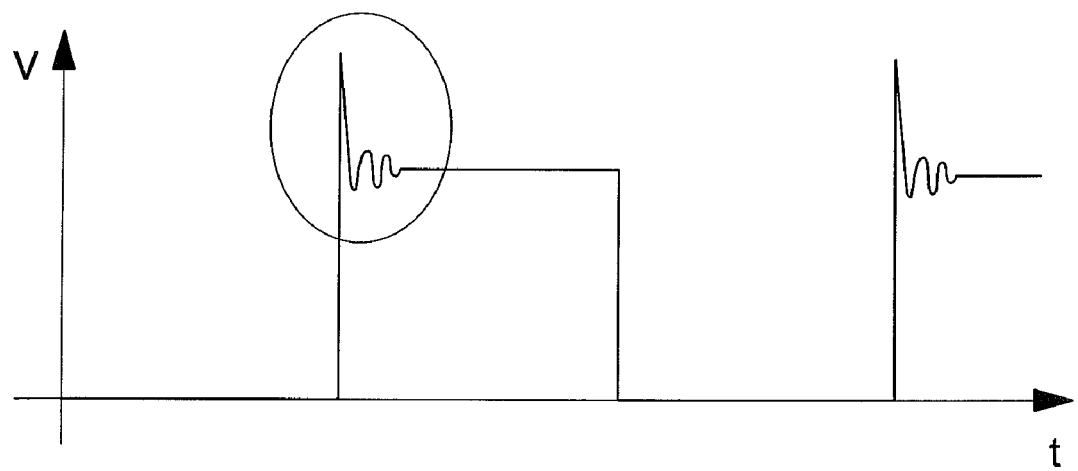
FIG. 9A is a graph of V-t and Vds with spikes of a conventional flyback converter.
Figure 9B:
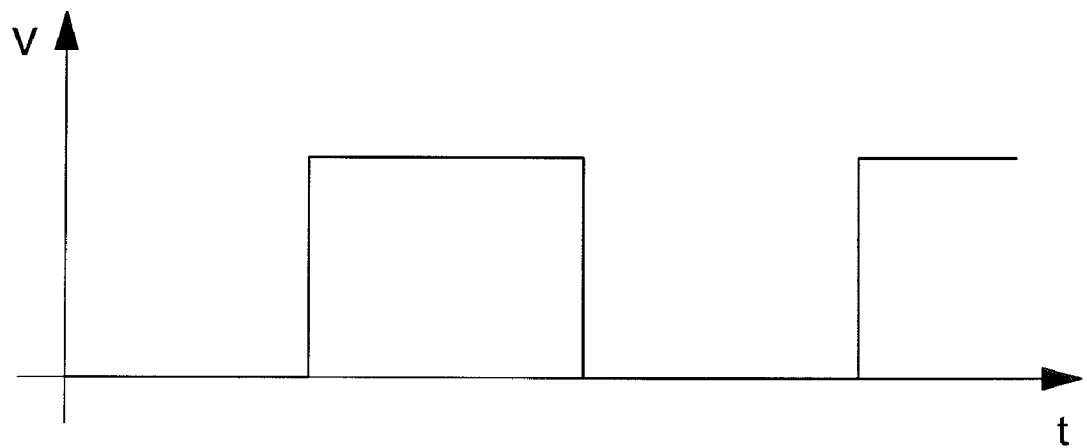
FIG. 9B is a spike-free graph of V-t and Vds in the boost-forward-flyback high gain convertor in accordance with the present invention.

With further reference to FIGS. 7, 9A and 9B, the boost-forward-flyback high gain convertor has very high transformation efficiency in a wide range of operating power. The present embodiment also resolves spike issues in a $V_{DS}$ waveform of a conventional flyback convertor. The spikes are caused by combination of elements of the flyback converter, such as inductance leakage, repose of alternative diode voltage drops or the like, and normally a Snubber circuit is needed to reduce the spikes in the $V_{DS}$ waveform. The addition of a Snubber circuit leads to higher cost and circuit complexity and decreases efficiency to the flyback converter. Comparing the flyback converters, the $V_{DS}$ waveform of the present invention is nearly spike-free, which not only improves the efficiency of the present embodiment but also reduces the cost and complexity of circuit elements.

In summary, the present embodiment combines benefits of conventional boost, forward and flyback convertors, i.e., combines active clamping and lower power pressure to the element from the boost convertor, increases the gain ratio from using the forward convertor and provides output to the load ($R_L$) when the switch (S) is OFF from the combination of the flyback and boost converting circuit.

The present invention not only has very high gain, high converting efficiency and lower power loading for devices but is also simple, cost less, and easy to use and has a small volume.

The disclosure in the foregoing description is illustrative only. Changes may be made in detail, especially in matters of shape, size and arrangement of parts within the principles of the invention to the full extent indicated by the broad general meaning of the terms in which the appended claims are expressed.

What is claimed is:

1. A boost-forward-flyback high gain converter comprising
a boost converting circuit being connected to an external voltage source and an external control signal source as inputs, being coupled to a load, the control signal source sends a control signal to the boost converting circuit to activate voltage conversion between the voltage source and the load, the boost converting circuit comprising
a switch having
a control end receiving a control signal from the control signal source;
a first end; and
a second end, the control end;
an input coil having
a first end connected to the voltage source; and
a second end connected to the first end of the switch;
a boost diode having
an anode being connected to the first end of the switch; and
a cathode; and
a boost capacitor having
a first end being connected to the cathode of the boost diode; and
a second end being connected to the second end of the switch and the voltage source;
a forward converting circuit comprises
an output coil being coupled to the input coil to form the transformer with the output coil and having a first end and a second end;
a forward capacitor having
a first end being connected to the first end of the output coil; and
a second end; and
a forward diode comprising
an anode connected to the second end of the output coil; and
a cathode connected to the second end of the forward capacitor; and
a flyback converting circuit being coupled to the output coil and comprising
a flyback diode having
an anode being connected to the second end of the forward capacitor and the cathode of the forward diode; and
a cathode; and
a flyback capacitor being connected in series to the boost capacitor and the flyback capacitor, the boost capacitor being connected in parallel to the load and having
a first end being connected to the cathode of the flyback diode; and
a second end being connected to the anode of the forward diode; and
a transformer being formed from the output coil in the forward converting circuit and the input coil of the boost converting circuit.

2. The boost-forward-flyback high gain converter as claimed in claim 1, wherein is pulse width modulation (PWM).

3. The boost-forward-flyback high gain converter as claimed in claim 1, wherein the switch is an FET having
a drain being the first end of the switch; and
a source being the second end of the switch.

4. The boost-forward-flyback high gain converter as claimed in claim 1, wherein the switch is an BJT.

* * * * *